(12) United States Patent
Rafac

(10) Patent No.: US 7,639,364 B2
(45) Date of Patent: *Dec. 29, 2009

(54) METHODS AND APPARATUS FOR BANDWIDTH MEASUREMENT AND BANDWIDTH PARAMETER CALCULATION FOR LASER LIGHT

(75) Inventor: Robert J. Rafac, Carlsbad, CA (US)

(73) Assignee: Cymer, Inc., San Diego, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 11/973,448

(22) Filed: Oct. 8, 2007

(65) Prior Publication Data

US 2008/0037025 A1    Feb. 14, 2008

Related U.S. Application Data

(63) Continuation of application No. 10/789,328, filed on Feb. 27, 2004, now Pat. No. 7,304,748, which is a continuation-in-part of application No. 10/615,321, filed on Jul. 7, 2003, now Pat. No. 6,952,267, which is a continuation-in-part of application No. 10/609,223, filed on Jun. 26, 2003, now Pat. No. 7,256,893.

(51) Int. Cl.
    *G01B 9/02*    (2006.01)
(52) U.S. Cl. .................................. 356/454; 372/32
(58) Field of Classification Search .................. 356/454, 356/519; 372/29.02–32

See application file for complete search history.

(56) References Cited

U.S. PATENT DOCUMENTS 6,043,883 A * 3/2000 Leckel et al. ................ 356/454
6,269,110 B1 * 7/2001 Leinhos et al. ............... 372/32

(Continued)

OTHER PUBLICATIONS

"Contribution of polychromatic illumination to optical proximity effects in the context of Deep-UV lithography", A. Kroyan, I. Lalovic, N. R. Farrar, *Proc. 21st Annual BACUS Symposium on Photomask Technology and Management*, G. T. Dao and B. J. Grenon (Eds), Monterey CA, SPIE vol. 4562, pp. 1112-1120, 2002.

(Continued)

*Primary Examiner*—Samuel A Turner

(57) ABSTRACT

A bandwidth meter method and apparatus for measuring the bandwidth of a spectrum of light emitted from a laser input to the bandwidth meter is disclosed, which may comprise an optical bandwidth monitor providing a first output representative of a first parameter which is indicative of the bandwidth of the light emitted from the laser and a second output representative of a second parameter which is indicative of the bandwidth of the light emitted from the laser; and, an actual bandwidth calculation apparatus utilizing the first output and the second output as part of a multivariable equation employing predetermined calibration variables specific to the optical bandwidth monitor, to calculate an actual bandwidth parameter. The actual bandwidth parameter may comprise a spectrum full width at some percent of the maximum within the full width of the spectrum of light emitted from the laser or a width between two points on the spectrum enclosing some percentage of the energy of the full spectrum of the spectrum of light emitted from the laser. The apparatus and method may be implemented in a laser lithography light source and/or in an integrated circuit lithography tool.

25 Claims, 9 Drawing Sheets

U.S. PATENT DOCUMENTS

| | | | |
|---|---|---|---|
| 6,317,448 B1 * | 11/2001 | Das et al. ..................... | 372/32 |
| 6,320,663 B1 | 11/2001 | Ershov | |
| 2002/0005955 A1 | 1/2002 | Kramer et al. ............. | 356/519 |
| 2003/0137672 A1 * | 7/2003 | Moriya et al. .............. | 356/519 |

OTHER PUBLICATIONS

"Understanding chromatic aberration impacts on lithographic imaging", K.Lai, I. Lalovic, R.Fair, A.Kroyan, C. Progler, N. R. Farrar, D. Ames, K. Ahmed, *J. Microlithography, Microfabrication and Microsystems*, vol. 2, Issue 2, pp. 105-111, 2003.

"Modeling the effects of excimer laser bandwidth on lithographic performance" A. Kroyan, J. J. Bendik, O. Semprez, N. R. Farrar, C. G. Rowan and C. A. Mack, SPIE vol. 4000, *Optical Microlithography XIII*, pp. 658-664, Mar. 2000.

European Search Report dated Jul. 23, 2009 from European Patent Application No. 04776567.2, filed on Jun. 26, 2003 (3 pages).

* cited by examiner

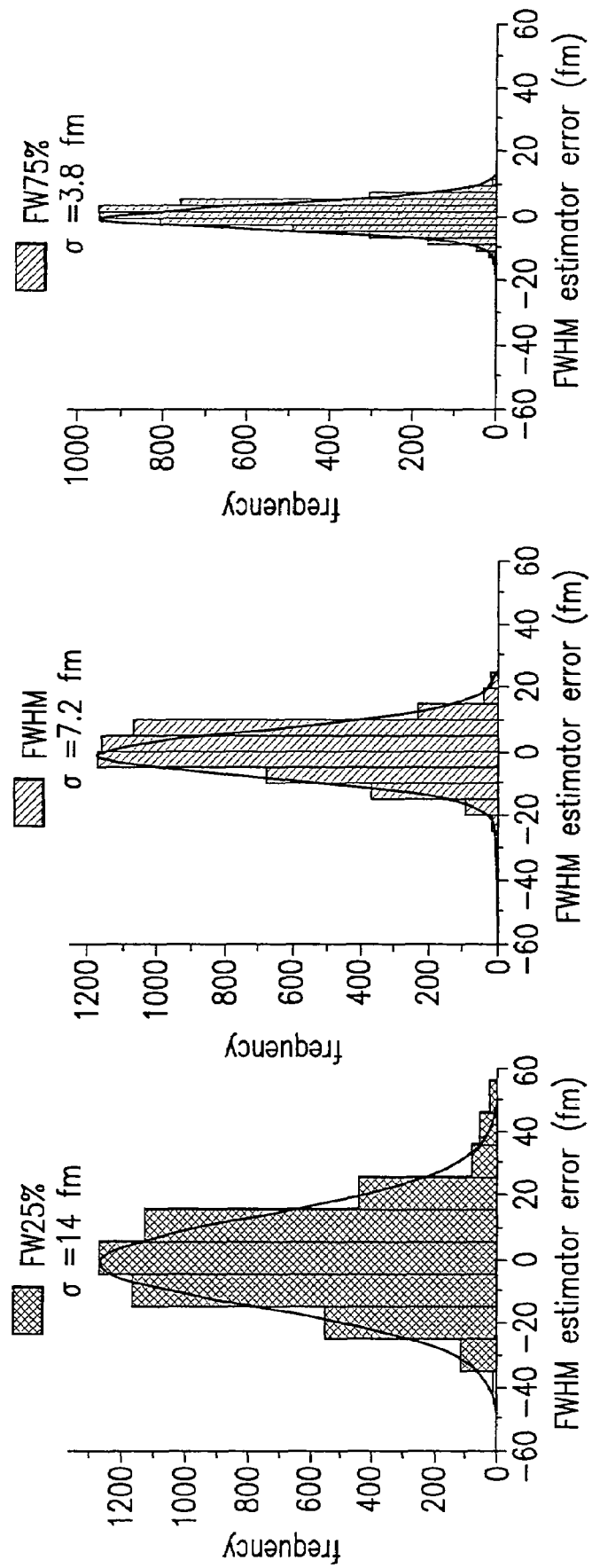

METHODS AND APPARATUS FOR BANDWIDTH MEASUREMENT AND BANDWIDTH PARAMETER CALCULATION FOR LASER LIGHT

RELATED APPLICATIONS

This application is continuation of U.S. patent application Ser. No. 10/789,328, filed on Feb. 27, 2004, which is a continuation-in-part of U.S. patent application Ser. No. 10/615,321, filed on Jul. 7, 2003, entitled OPTICAL BANDWIDTH METER FOR LASER LIGHT, with inventor Rafac, and is also a continuation-in-part of U.S. application Ser. No. 10/109,223, filed on Jun. 26, 2003, entitled METHOD AND APPARATUS FOR MEASURING BANDWIDTH OF AN OPTICAL OUTPUT OF A LASER, also with Rafac as an inventor, both assigned to the assignee of the present application, the disclosures of each of which are hereby incorporated by reference.

FIELD OF THE INVENTION

The present invention relates to the determination of the spectral bandwidth of a laser. More generally the present invention relates to the accurate estimation of the bandwidth of an optical source using interferometric or diffractive instruments ("spectrometers") whose impulse response functions have bandwidth generally comparable to or larger than that of the source being measured.

BACKGROUND OF THE INVENTION

The output spectrum of a line-narrowed excimer laser light source for DUV lithography is not generally constant in time. While stability has greatly improved with advances in technology, neither the bandwidth nor the functional form (shape) of the spectrum is perfectly fixed. The impact of spectral shape changes on lithographic performance has so far been not completely characterized, however, the influence of full-width at half-maximum ("FWHM") and 95%-enclosed energy ("I95%" or "E95" or sometimes referred to as "spectral purity") illumination bandwidths on image contrast, log-slope, exposure latitude, etc., have been found to be significant, as discussed in "Contribution of polychromatic illumination to optical proximity effects in the context of Deep-UV lithography", A. Kroyan, I. Lalovic, N. R. Farrar, *Proc. 21st Annual BACUS Symposium on Photomask Technology and Management*, G. T. Dao and B. J. Grenon (Eds), Monterey Calif., SPIE Vol. 4562, pp. 1112-1120, 2002 and "Understanding chromatic aberration impacts on lithographic imaging", K. Lai, I. Lalovic, R. Fair, A. Kroyan, C. Progler, N. R. Farrar, D. Ames, K. Ahmed, *J. Microlithography, Microfabrication and Microsystems*, Vol. 2, Issue 2, pp. 105-111, 2003, the disclosures of which are hereby incorporated by reference.

Dependence on the illuminating spectrum arises, e.g., because optical material constraints at DUV wavelengths make some chromatic aberration unavoidable in projection lenses for KrF and ArF lithography. While chromatic effects can be minimized with a spectrally narrowed light source, even sub-picometer broadening of the illumination spectrum cannot be completely ignored, as discussed in "Modeling the effects of excimer laser bandwidth on lithographic performance" A. Kroyan, J. J. Bendik, O. Semprez, N. R. Farrar, C. G. Rowan and C. A. Mack, SPIE Vol. 4000, *Optical Microlithography XIII*, pp. 658-664, March 2000, the disclosure of which is hereby incorporated by reference. The concern becomes even more pressing as the industry moves to ever-higher numerical aperture settings and lower values of $k_1$. To guarantee that the aerial image properties are maintained within a given process window, it is therefore increasingly more important to have trustworthy metrologic feedback from the light source reporting these spectral figures-of-merit with high accuracy and reliability and stability. Further, in more advanced applications this information can actually be used to control the workings of the light source in some way, so as to stabilize the light source spectrum or otherwise modulate its bandwidth. In such scenarios, the enhanced spectral performance repeatability obtained means that generic optical-proximity (OPC) solutions can be imagined that remain effective and consistent over the system lifetime, e.g., including requirements for enhanced ability to strictly control bandwidth within some range, i.e., below some threshold but also above some threshold.

Commonly used bandwidth metrics such as FWHM and E95 are not always accurate measures of spectral shape, especially when either is considered alone. For example, an increase in the energy content of the far wings of a spectrum can significantly increase the E95 bandwidth value, while leaving the FWHM bandwidth value essentially and effectively unchanged. Other spectral shape changes can, e.g., leave the E95 constant while altering the FWHM, or can, e.g., leave both these metrics constant while changing the center-of-energy of the spectrum or other performance-significant parameter of the spectrum. These shape changes can often go hand-in-hand with, e.g., bandwidth changes, with significant consequences for the design of spectral metrology tools and the performance of systems relying upon their effectiveness in accurate bandwidth estimation, and particularly in systems, which are becoming ever more prevalent, where metrology feedback and concomitant control functions are required to be on a pulse by pulse basis at repetition rates to and exceeding 4000 Hz.

Variations in the detailed shape and bandwidth of ultra-narrow excimer laser light sources can originate in a variety of physical mechanisms. Some of this variation is technically unavoidable, and a somewhat effective strategy to overcome this in the past has been to design the light source in a manner that is generally optimized to minimize the effects of such variation. Even with engineering controls, however, large changes in spectral shape or bandwidth can sometimes occur due to improper alignment, failure of optical components, or failure to manage important process parameters internal to the light source (e.g., laser gas mixture). It is the job of the onboard spectral metrology package to correctly identify and accurately report the light source bandwidth so that it may be used as trustworthy input to the lithographic process control. To illustrate these shape changes, a number of examples of typical spectral shape variation seen in a Cymer XLA 100 ArF MOPA (Master-Oscillator/Power-Amplifier) light source measured with a high-resolution double-pass echelle grating spectrometer are shown in FIGS. 1A-D. This collection is not exhaustive, but is believed to be typical of a light source of the current generation. The data has been normalized to equal total energy content for a better comparison of the spectral energy distribution, and to better represent the integrated spectral content for an exposure of, e.g., 200 laser pulses.

SUMMARY OF THE INVENTION

A bandwidth meter method and apparatus for measuring the bandwidth of a spectrum of light emitted from a laser input to the bandwidth meter is disclosed, which may comprise an optical bandwidth monitor providing a first output representative of a first parameter which is indicative of the bandwidth of the light emitted from the laser and a second output representative of a second parameter which is indicative of the bandwidth of the light emitted from the laser; and, an actual bandwidth calculation apparatus utilizing the first output and the second output as part of a multivariable equation employing predetermined calibration variables specific to the optical bandwidth monitor, to calculate an actual bandwidth parameter. The actual bandwidth parameter may comprise a spectrum full width at some percent of the maximum within the full width of the spectrum of light emitted from the laser ("FWXM") or a width between two points on the spectrum enclosing some percentage of the energy of the full spectrum of the spectrum of light emitted from the laser ("EX"). The bandwidth monitor may comprise an etalon and the first output is representative of at least one of a width of a fringe of an optical output of the etalon at FWXM or a width between two points on the spectrum enclosing some percentage of the energy of the full spectrum of light emitted from the laser ("EX'") and the second output is representative of at least one of a second FWX"M or EX'", where X≠X" and X'≠X'". The precomputed calibration variables may be derived from a measurement of the value of the actual bandwidth parameter utilizing a trusted standard, correlated to the occurrence of the first and second outputs for a calibration spectrum. The value of the actual bandwidth parameter is calculated from the equation: estimated actual BW parameter=$K*w_1+L*w_2+M$, where $w_1$=the first measured output representative of FWXM or EX' and $w_2$ is the second measured output representative of FWX"M or EX'". The apparatus and method may be implemented in a laser lithography light source and/or in an integrated circuit lithography tool.

BRIEF DESCRIPTION OF THE DRAWINGS

FIGS. 8A-C show improvements of a point-slope FWHM estimator model with fringe width measurement at increasing intensity thresholds X%=25%, 50%, 75% according to an embodiment of the present invention, utilizing, e.g., a population of ~5000 sample spectra, e.g., identical to those used in connection with FIG. 16;

DETAILED DESCRIPTION OF PREFERRED EMBODIMENTS

Figure 1A:
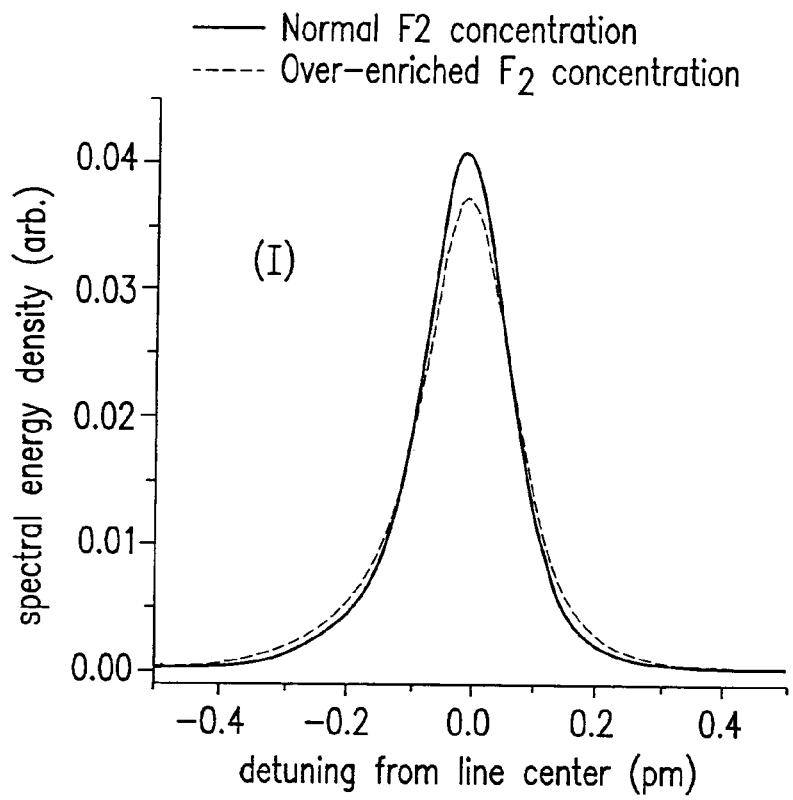
FIGS. 1A-D show various responses of the bandwidth spectral shape due to the alteration of certain parameters of laser operation.

Example I in FIG. 1A demonstrates the impact of greatly enriching the fluorine concentration of the laser gas in the master-oscillator of a MOPA or the gain medium of a single-oscillator, e.g., an ArF single chamber light source. With the addition of extra fluorine to the gas mixture at constant total pressure, the bandwidth increases. In these measurements the FWHM was found to stay constant within the precision of the measurement as fluorine was enriched to 13% above the initial concentration. The E95 was not constant, however, but increased by 18% for the same enrichment. This indicates, e.g., a significant change in the functional form of the spectrum, and not, e.g., simply a rescaling of the wavelength axis. Such a large over-enrichment of the laser gas mix is not typical, but could be representative of a hypothetical failure mode of a light source's internal controls, and in any event is indicative of symptomatic changes in bandwidth spectral shape with lesser increases in fluorine content in the laser chamber.

Figure 1B:
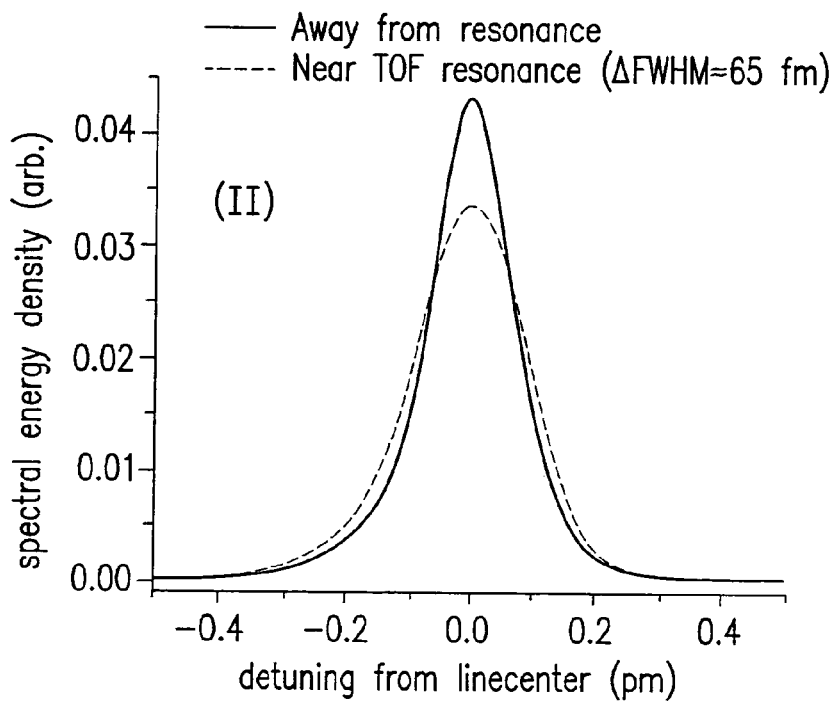

Example II shown in FIG. 1B illustrates, e.g., the effect of an acoustic disturbance, e.g., timed to pass through the electrode gap during laser oscillation. As evidenced by the fact that the wings of the spectrum remain fixed while the central peak of the spectrum flattens and widens, the shape of the spectral profile is seen to change in response to such a so-called bandwidth resonance peak event. The effect of this shape change in the spectral shape is opposite to that of the previous example of FIG. 1A. In this case the FWHM bandwidth increased by 52% over the nominal value obtained away from the time-of-flight ("TOF") resonance, otherwise known as acoustic resonance, while the E95 only rose 8% beyond the nominal value. The size of the TOF resonance effect can be greatly reduced with careful discharge chamber designs, but is present to some degree in all high-repetition rate systems and can occur randomly at differing operating laser discharge and output pulse repetition rates, temperatures and other parameters of laser operation.

Figure 1C:
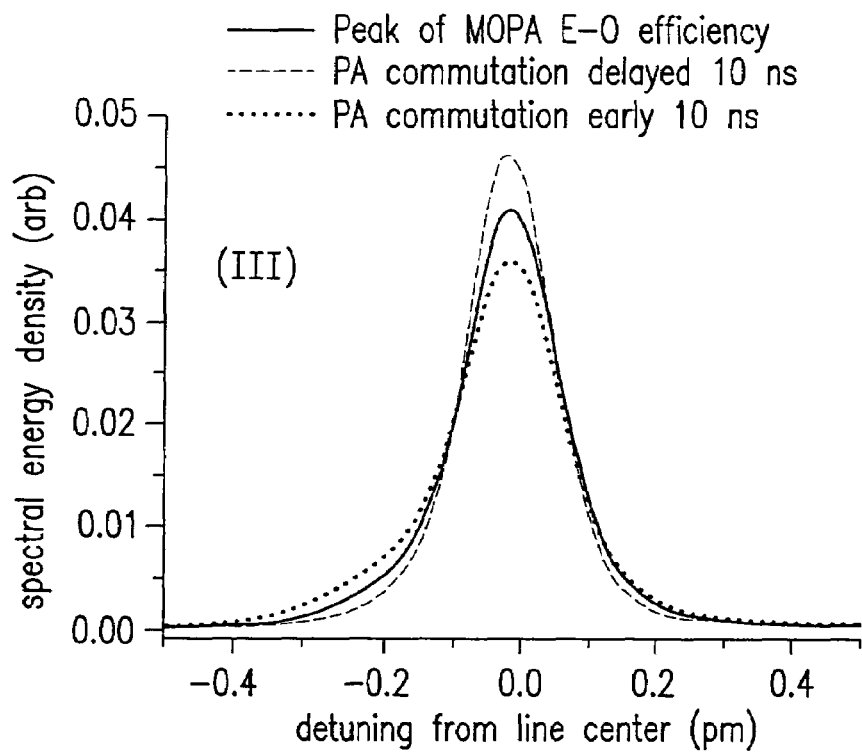

Example III shown in FIG. 1C illustrates a change due to a very large static error in the relative timing of the discharge onset in the gain medium between two chambers of a MOPA light source. This phenomenon arises, e.g., because the spectral shape and bandwidth of the MO output is time-dependent. This behavior is therefore somewhat unique to MOPA systems (MOPO architectures have a further spectral complication due to gain competition between the injected and free-running modes of the power oscillator). In normal operation, the delay between firing of the two chambers is chosen to be that time $\tau_0$ corresponding to the peak of MOPA-system electrical-to-optical conversion efficiency. In this measurement of shape versus time delay, the bandwidth decreased by about 10% in FWHM and 25% in E95 when the delay was increased to $\tau_0+10$ ns. When the delay was decreased to $\tau_0-10$ ns, the bandwidth was seen to increase by approximately the same amount. Changing this delay can be used to control the bandwidth in a MOPA configuration, but such large offsets from the efficiency peak introduce trade-offs against controlling other properties of the laser output. This result also serves to further illustrate that, e.g., there are spectral shape consequences for failure of a light source's internal controls.

Figure 1D:
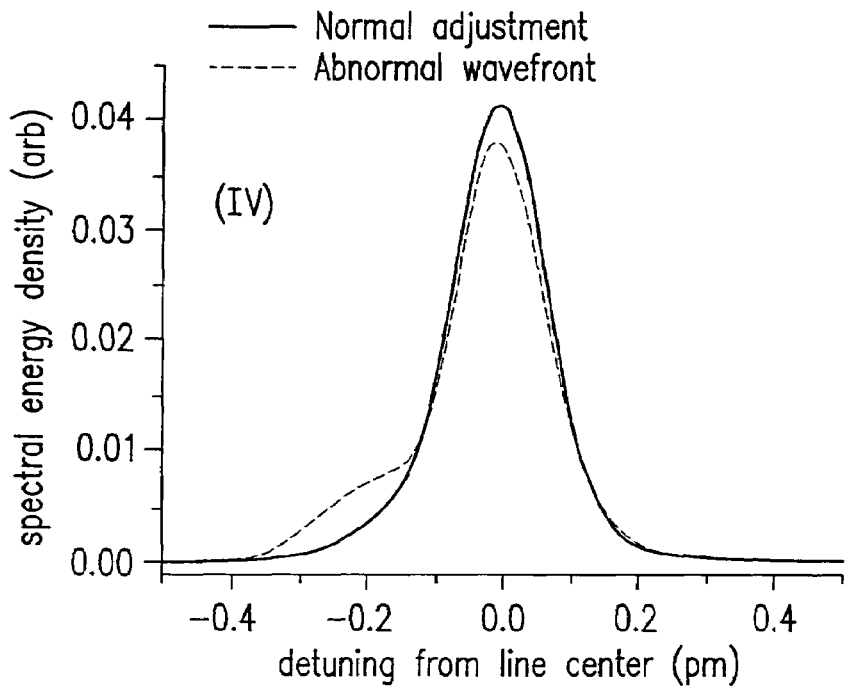

The final example IV in FIG. 1D shows the response of the laser spectrum to, e.g., an exaggerated wavefront curvature, e.g., inside the resonator of a grating-narrowed laser oscillator (MO or single-chamber oscillator). In this experiment, e.g., the surface figure of a reflecting optic inside the line-narrowing subsystem was artificially distorted by application of mechanical force to simulate the effects of a defective component inside the laser cavity. The effect on spectral shape was quite profound, as can be seen in the figure. This is a second example where the FWHM was altered very little by the shape change, but the E95 changed by nearly a third. The symmetry of the spectrum was also destroyed by this perturbation. This kind of variation is not normal for a well-designed light source, but has been observed to manifest itself, e.g., with a defective or failing optic due, e.g., to excessive thermal loading, differential thermal expansion between a reflecting optic and its mounting, etc.

These four illustrations cover the dominant types of spectral shape variation seen in research and development efforts ongoing at applicants assignee. They are but illustrative of types of spectral changes that can and do quite often occur which can result in erroneous metrology, which can, e.g., report bandwidth within specifications, whatever are chosen for the specifications, when the actual bandwidth is not in specification and out of specification when the actual bandwidth is not out of specification. Either case is detrimental to laser operation in the very high repetition rate tightly controlled wavelength/bandwidth, bandwidth stability, dose stability and other stringent operating parameter measurement and control requirements. The challenge is to develop metrology on-board or external to the light source that does not fail to account for the spectral changes that could negatively impact lithographic performance of the illuminated exposure tool, and to do this accurately in spite of, e.g., changes in the functional form or shape of the spectrum.

Many examples exist of bandwidth measurement and estimation techniques for DUV light sources. However, the development of accurate and robust spectral metrology on a per-pulse basis for a high repetition-rate excimer laser source is very technically challenging and at least much more technically challenging than may heretofore have been appreciated in prior art metrology systems. For future-generation light sources, an ideal spectral metrology solution would have most, if not all, of the following five features. The solution may require, e.g., very high spectroscopic resolution, which can be recast more rigorously, e.g., by requiring that the impulse response (instrument function) of the spectrometer should have a bandwidth many times smaller than that of the light source spectrum. The solution may also require, e.g., wide inspection range in wavelength ($\lambda$) space. It has been suggested that even small changes in the far wings of the illumination spectrum can significantly impact the aerial image properties; this requirement is similarly necessary for direct computation of E95, as discussed, e.g., in "Effects of 95% integral vs. FWHM bandwidth specifications on lithographic imaging", A. Kroyan, I. Lalovic and N. R. Farrar, SPIE Vol. 4346, *Optical Microlithography XIV*, pp. 1244-1253, March 2001, the disclosure of which is hereby incorporated by reference. The solution may also require, e.g., an accurate and robust method for disentangling (deconvolving) the bandwidth of the source spectrum from the instrument function of the spectrometer, which in general is non-negligible to assuring proper measurements and is becoming increasingly more critical. This could, e.g., either be a direct deconvolution using an independent measurement of the instrument function, or some sort of mathematical or semi-empirical model, e.g., that obtains a similar result or estimate. The solution may also require, e.g., a high signal-to-noise ratio ("SNR") for a single-pulse measurement. Ideally, e.g., this is required for per-pulse assessment of spectral quality and lithographic process judgment. The system may also require, e.g., optical and mechanical simplicity and robustness, which can be necessary, e.g., for stability of calibration, repeatability of measurement, and long-life in, e.g., a lithography production environment.

Figure 2:
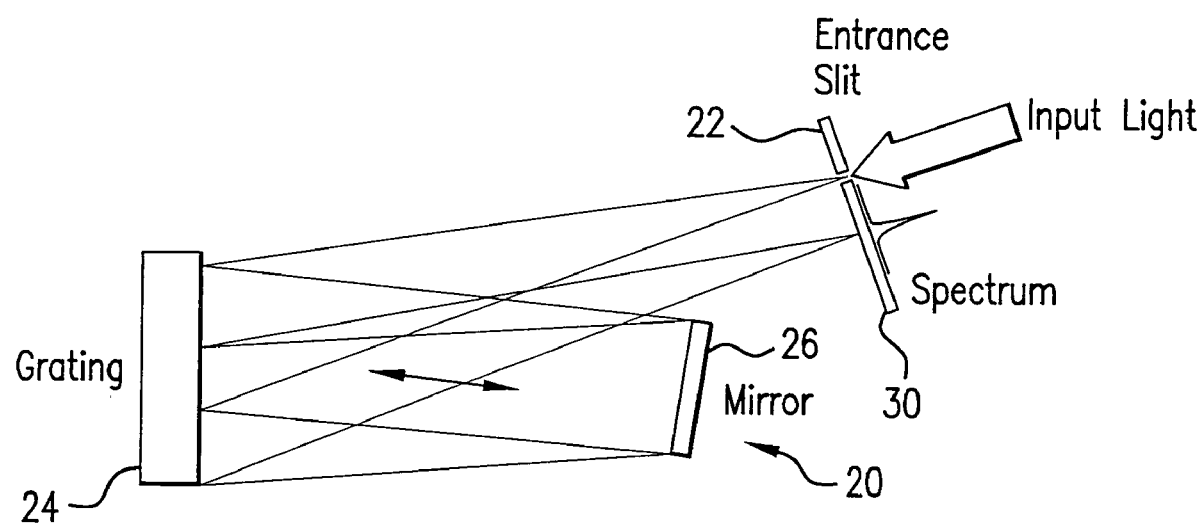
FIG. 2 shows an embodiment of a double-pass grating spectrometer.

It may be difficult (if not impossible) to simultaneously satisfy all of these requirements with current technology. Multi-pass grating spectrometers, e.g., as shown in FIG. 2 can provide excellent spectroscopic resolution, wide inspection ranges, and ability to deconvolve the influence of the instrument function using Fourier or other methods. As shown in FIG. 2, such a spectrometer 20 may include, e.g., an entrance slit 22, a grating 24, and a maximum reflectivity mirror 26, along with a spectral intensity detector 30. However, such instruments are bulky, fragile, generally require moving parts for tuning, and can be hard to install, align, calibrate and maintain. Because of their low acceptance, high-resolution grating spectrometers also require long exposures for an adequate ("SNR"), rendering them impractical for per-pulse reporting of spectral quality. They are also expensive, commanding prices that may reach a significant fraction of the total outlay for a high-performance light source, e.g., a laser lithography tool light source. Grating spectrometers are indispensable tools for system qualification and in research roles where very fine details of spectral shape and out-of-band energy distribution must be accurately characterized in terms of spectral purity, line asymmetry, etc. They are not generally practical, however, for onboard real-time wavelength or bandwidth metrology measurements, e.g., in lithography production applications.

Figure 3:
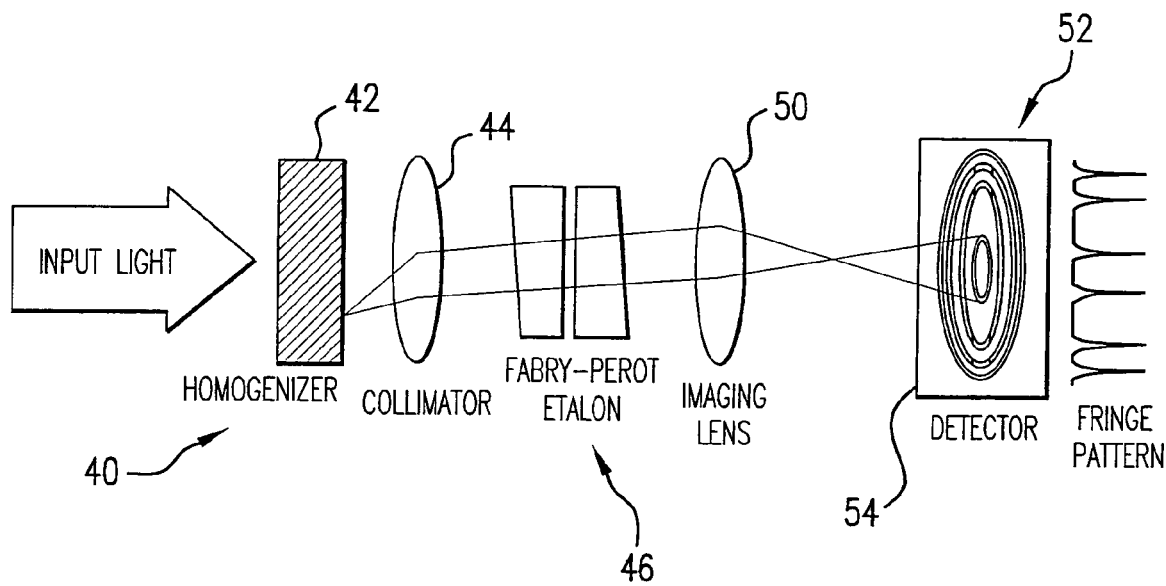
FIG. 3 shows a spectrometer utilizing the angular dispersion of a single plane-etalon according to an embodiment of the present invention.
Figure 4:
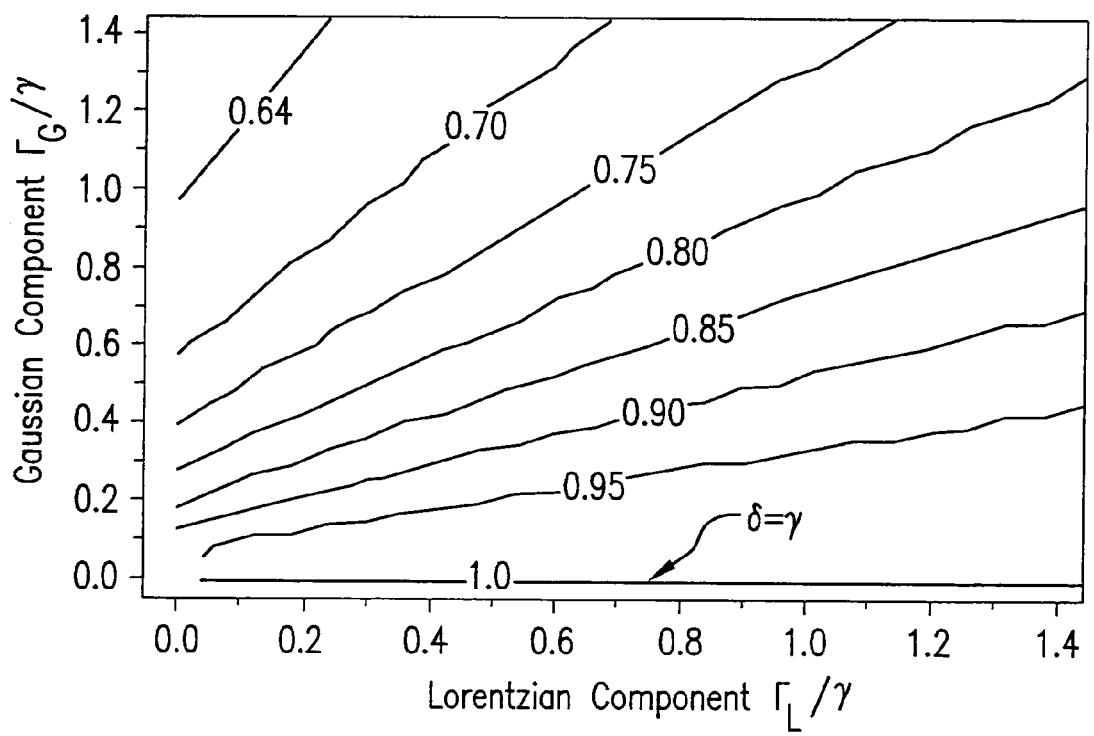
FIG. 4 shows contours of the difference between Voigt source and Lorentzian instrument-convolved spectral FWHM bandwidth versus shape parameters in units of the Lorentzian FWHM bandpass γ.

Fabry-Perot etalon spectrometers, e.g., as shown in FIG. 3 can provide an alternative solution. They are optically simple and can be made mechanically robust with no moving parts. Such a spectrometer 40, as shown in FIG. 4 may include, e.g., a beam homoginizer 42, a collimating lens 44, an etalon 465, an imaging lens 50 and an intensity detectory 52, which may include, e.g., a lateral photo-diode array 54. The lack of necessity for a slit means that for a given input, a large irradiance can be obtained in the detector plane, e.g., at the PDA 54, e.g., even in spite of poor beam quality. Because of this a plane-mirror etalon 46 can capture useful spectral information from a single short pulse of illumination by utilizing the angular discrimination between transmitted beams at different wavelengths.

To compete with grating spectrometers purely on the basis of spectroscopic resolution and inspection interval, long free spectral range ("FSR"), high transmission, and high-finesse ($\mathfrak{F}$) etalons are required. A commercial double-pass echelle grating spectrometer for use in a DUV light source might achieve a fixed inspection range of 15 pm and an instrument function of 50 fm FWHM bandpass when operating in high order. To match this performance with an etalon spectrometer, an FSR≈15 pm and a finesse of $\mathfrak{F}$≈300 would be required. While this kind of performance is routinely surpassed for longer wavelengths, it is not practical in the DUV, where surface figure (parallelism, flatness, roughness) and mirror coating limitations typically limit the total finesse to $\mathfrak{F}$<50. The finesse-loss due to geometric imperfections can be reduced by using a spherical-confocal etalon that is mode-degenerate, because the focusing effect of the spherical mirrors results in a mode diameter that is small on the mirror surface thereby suppressing the influence of geometric imperfections. Unfortunately, in this configuration the inter-mirror optical path length must be scanned for spectral analysis, which can make analysis of isolated short pulses or even of a few pulses in a burst of pulses impractical. Further, for a given spacing the FSR is halved using this method, and the mode-matching requirement also means that, e.g., the insertion loss can be prohibitively high for beams of poor quality. Therefore, the confocal arrangement discards many of the special advantages of the etalon spectrometer 40 in trying to obtain grating spectrometer-like performance. A similar conclusion obtains for other schemes that obtain high spectroscopic resolution and large inspection ranges with series arrangements of multiple etalons.

In spite of these limitations, air-spaced plane-etalon spectrometers are often the best choice for numerous spectral measurement tasks. While not offering the largest inspection ranges or resolving powers in the DUV, reasonable compromises can be reached in these areas while retaining the desired features, e.g., superior single-short-pulse SNRs and adaptability to manufacturing applications that require physical robustness and reliability. For spectral monitoring, e.g., of lithographic tool illumination, plane etalons with FSRs from 2 to 40 pm attaining finesse values from 20-50 can be employed. This means that these devices are used in a regime where the ratio of the FWHM bandwidth of the spectrometer instrument function to the bandwidth of the light source spectrum is close to or greater than unity. In this regime, the etalon FWHM fringe width, as discussed above, has been shown to have non-negligible sensitivity to details of the source spectral shape other than its FWHM, including, e.g., the spectral purity, i.e., the amount of integrated energy within some area of the spectrum on either side of the peak wavelength, usually measured as E 95% or E95, with the spectral purity increasing as the width of, e.g., E95 decreases.

As was discussed above the spectral shape of DUV light sources may vary significantly, particularly in cases of defective components or controls. These shape changes may "hide" beneath the instrument function of the spectrometer and influence its output. Therefore, applicant has determined that special emphasis must be placed on the third requirement listed above, namely, that the method used to estimate the bandwidth of the source spectrum from the etalon fringe measurement be dependable and free from systematic error caused by changes in the shape of the source spectrum.

Consideration must be had of the impact of spectral shape on estimation of source light bandwidth. A number of techniques can be applied to recover the complete source spectrum or source bandwidth from a spectrometer measurement. The signal output $O(\lambda)$ by the spectrometer is the convolution of the source spectrum $S(\lambda)$ and the instrument function of the spectrometer $I(\lambda)$:

$$O(\lambda) = \int_{-\infty}^{\infty} S(\Lambda) I(\lambda - \Lambda) d\Lambda \qquad (1)$$

Three methods are commonly employed to determine the bandwidth of a source spectrum $S(\lambda)$ given the spectrometer signal $O(\lambda)$. It will be understood by those skilled in the art that the output signal may be, e.g., the result of the detection of fringes, e.g., from the optical output of an etalon by the use, e.g., of a photo-diode array ("PDA") which may detect, e.g., the intensity distribution of light laterally across the diodes of the array. Such intensity values may then be used to produce a plot of the intensities, which mathematically, using, e.g., interpolative techniques can be used, e.g., by a digital processor to compute the location in the array of intensities amounting to, e.g., a FWHM or a FW75% M or FW35% M, as examples and/or the positions in the array of intensities that constitute the bounds of an E95 value, or an E75 value, or the like. Therefore, the output signal of the detector in the form of an array of intensities of light distributed, e.g., along a linear arrangement of photo-diodes, is converted to another signal representative of a value derived from the bandwidth detector output function $O(\lambda)$, which the overall system utilizes as the measurement of, e.g., FWHM or E95 or the like. This is one form of an output from the bandwidth detector that is representative of a parameter that in turn is representative of the actual bandwidth of the light source, i.e., representative of the actual FWHM or E95.

The most complete of the commonly applied methods is a full deconvolution of the signal $O(\lambda)$. Given $O(\lambda)$ and an independent determination of $I(\lambda)$, a solution to Equation 1 can be found, e.g., using Fourier or other methods. This can be a challenging task, however, because in general there are many source spectra $S(\lambda)$ that convolve with $I(\lambda)$ to give the same actual output signal $O(\lambda)$, which is the complete $O(\lambda)$, only discrete portions of which the bandwidth detector imager, i.e., PDA, actually "sees" and from which the values of the representative parameters, e.g., FWHM or E95 are calculated by the bandwidth detector system.

Usually special efforts must be made to deal with noise in the measurements and zeros in $I(\lambda)$, and for a fine-grained spectrum this process can take a considerably amount of processing time. For these and other reasons, this method is generally not well suited for monitoring of the bandwidth of a light source spectrum on a per-pulse basis in high-repetition rate applications. This method is still preferred when using high-resolution grating spectrometer measurements for basic research or in light-source manufacturing test environments, where very detailed knowledge of the average spectrum is required.

A second technique appeals to mathematical arguments made on the basis of analytic approximations of the source spectrum and instrument function. For example, in the cases where the spectral densities $S(\lambda)$ and $I(\lambda)$ are both perfectly Lorentzian or both perfectly Gaussian in distribution, the FWHM and E95 bandwidths of the source spectrum $S(\lambda)$ are very simply related to the bandwidths of $O(\lambda)$ and $I(\lambda)$. For example, consider a Lorentzian source spectrum and instrument function with FWHM bandwidths $\Gamma_S$ and $\Gamma_I$, respectively:

$$S(\lambda) = \frac{1}{\pi} \frac{\Gamma_S/2}{(\lambda-\lambda_0)^2 + (\Gamma_S/2)^2}, \quad (2)$$

$$I(\lambda) = \frac{1}{\pi} \frac{\Gamma_I/2}{(\lambda-\lambda_0)^2 + (\Gamma_I/2)^2}$$

$$O(\lambda) = \int_{-\infty}^{\infty} S(\Lambda)I(\lambda-\Lambda) = \frac{1}{\pi} \frac{(\Gamma_S+\Gamma_I)/2}{(\lambda-\lambda_0)^2 + ((\Gamma_S+\Gamma_I)/2)^2} \Rightarrow \Gamma_S = \Gamma_O - \Gamma_I.$$

Hence, in this case the FWHM bandwidth $\Gamma_S$ of $S(\lambda)$ is found just by subtraction of a constant. The E95 value could be handled similarly, because $$E\left[\frac{1}{\pi} \frac{\Gamma/2}{(\lambda-\lambda_0)^2 + (\Gamma/2)^2}\right] = \Gamma\tan\left(0.95\frac{\pi}{2}\right) \approx 12.71\Gamma, \quad (3)$$

where E[ ... ] denotes the E95 bandwidth of the bracketed spectral distribution.

A third and widely used method for obtaining the light source bandwidth without full deconvolution begins with Equations 2 and 3 as a first guess, but modifies its form or adds additional corrective terms to reduce the systematic error that results from, e.g., imperfect assumptions about the shape of the source spectrum and/or instrument function. It is therefore semi-empirical in character and requires calibration against a trusted measurement. In a typical scenario the light source is run through some series of operating modes or conditions that cause its bandwidth to vary. The source FWHM bandwidth $\Gamma_S$ is carefully determined during this test using, e.g., an external high-resolution grating spectrometer and Fourier deconvolution (or by some other means). At the same time, the output of the metrology system undergoing calibration is recorded. As noted above, this output can be, e.g., the FWHM fringe width w of an etalon spectrometer contained inside the light source, or some digital or analog signal representative of the detected w. With this data in hand, the source bandwidth $\Gamma_S$ can be estimated from the relation $\Gamma_S \approx f(w)$. The best choice for the semi-empirical model f can be made from inspection of the data and/or by recourse to mathematical reasoning such as noted in the just preceding paragraph.

Looking at these semi-empirical models in more detail, the simplest choice of model, e.g., for FWHM bandwidth estimation is the subtraction of an experimentally determined constant offset:

$$\Gamma_S \approx f(w) = w - \delta \quad (4)$$

This model is mathematically exact, e.g., when both the light source spectrum and the instrument function of the spectrometer are purely Lorentzian, as is seen in Equation 2 above. An etalon spectrometer may have an instrument function $I(\lambda)$ that is very nearly Lorentzian, but as illustrated above the spectrum $S(\lambda)$ of the DUV light source is in general not well approximated by either a Gaussian or Lorentzian distribution, and in fact can be quite difficult to parameterize. The simple fact that the ratio E95/FWHM is not constant, as shown, e.g., for the spectra shown in FIGS. 1A-D, provides a straightforward indication that Gaussian or Lorenzian assumptions are inadequate. This ratio remains constant for these analytic forms as can be seen from Equation 3, etc. Therefore, the constant offset model (Equation 4) will give an imperfect estimate of the source bandwidth $\Gamma_S$, subject to a systematic error dependent on the details of the spectral shape. To illustrate this point, consider a hypothetical light source the spectrum $S_V(\lambda)$, which is shaped very nearly like a Voigt profile. A Voigt profile is a convolution of Lorentzian and Gaussian distributions having equal energy content:

$$S_V(\lambda) = \int_{-\infty}^{\infty} d\lambda' \left(\frac{1}{\pi} \frac{\Gamma_S/2}{\lambda'^2 + (\Gamma_S/2)^2} \cdot \frac{1}{\sigma\sqrt{2\pi}} \exp\left[-\frac{1}{2}\left(\frac{\lambda-\lambda'}{\sigma}\right)^2\right]\right). \quad (5)$$

The source spectral shape is then completely characterized, e.g., by two parameters, which are the FWHMs $\Gamma_L$ and $\Gamma_G = 2\sigma\sqrt{-2\ln(1/2)} \approx 2.35\sigma$ of the Lorentzian and Gaussian components. The output $O_V(\lambda)$ of an etalon spectrometer illuminated by this source is well-approximated by the convolution of $S_V(\lambda)$ with a purely Lorentzian instrument response $I_V(\lambda)$, where the FWHM $\gamma$ of this Lorenztian is given by the ratio of the etalon FSR to its finesse $\mathfrak{F}$:

$$O_V(\lambda) = \int_{-\infty}^{\infty} d\Lambda\left(\frac{1}{\pi} \frac{\gamma/2}{\Lambda^2 + (\gamma/2)^2} \cdot S_V(\lambda - \Lambda)\right); \quad (6)$$

$$\gamma = \frac{FSR}{\mathfrak{F}}.$$

FIG. 4 shows the difference between the FWHM of the etalon spectrometer output fringe $O_V(\lambda)$ and the FWHM of the source spectrum $S_V(\lambda)$ relative to $\gamma$ as a function of the two independent shape parameters $\Gamma_L/\gamma$ and $\Gamma_G/\gamma$. As $\Gamma_G \to 0$, the difference $\delta$ between the etalon fringe FWHM and the FWHM of the source spectrum approaches a limiting value of $\gamma$ as expected. This is the condition described by Equation 2. But as the width of the Gaussian component increases, $\delta$ gets smaller and the constant-offset model of Equation 3 will fail to give an accurate estimate of the source bandwidth within current and approaching accuracy and consistency requirements. This discussion is somewhat artificial but illustrates the variation between limiting cases of Lorentzian and Gaussian light sources clearly.

Performance of the constant-offset model can be improved by extending it to a point-slope model:

$$\Gamma_S \approx f(w) = Aw - B \quad (7)$$

The point-slope model works well for the hypothetical Voigt spectral distribution $S_V(\lambda)$, however, only if the parameters $\Gamma_L$ and $\Gamma_G$ are constrained in their variation; for example, if there is a linear relationship $\Gamma_G = m\Gamma_L + b$, where m and b are constants, and the overall bandwidth variation of $S_V(\lambda)$ does not cover too wide a range. However, if the spectral shape is poorly constrained the point-slope model can also suffer from inaccuracies, which increasing are becoming intolerable. In the case of FWHM estimation, it is worth again noting that the performance of these simple models improves greatly when the FWHM bandpass of the instrument function $I(\lambda)$ is made very small. As also discussed above, however, this is difficult or impossible to achieve for plane etalon assemblies of even moderate FSR in the DUV.

A more robust method for estimation of bandwidth using etalon spectrometers will now be discussed. For an arbitrary light source spectrum $S(\lambda)$ it might seem that the only useful bandwidth estimation can come from rigorous deconvolution of spectra obtained from a device with very high spectroscopic resolution. Further, it might seem that E95 estimation is even more untenable because it requires integration of the source spectrum over a wide range of wavelengths. Fortunately, with a clear understanding of the limitations of the technique, robust semi-empirical methods for bandwidth estimation of both FWHM and E95 using relatively wide bandpass etalons may still be obtained. Applicant and his colleagues have studied a number of techniques for estimating the bandwidth of, e.g., DUV excimer light source spectra using the width of etalon fringes as input. By construction, these techniques are designed to suppress or actively correct systematic errors that arise due to spectral shape change. Most of the methods under investigation rely on three simple observations. First, the wider the FWHM bandpass $\gamma=FSR/\Im$ of the etalon, the more the fringe FWHM w is influenced by energy in the wings of the source spectral distribution (and hence its E95). Second, if the full-width at X% of peak intensity ("FWX%" or "FWXM") of the fringe is measured, as X→100% the full-width depends mostly on the energy content near the center of the source spectral line. As X→0%, the full-width depends more on the energy content in the wings of the source spectrum. Third, the space of bandwidths and spectral shapes accessible to a single-oscillator or MOPA light source is constrained to a limited range, even in cases of pathological operation or failure of internal components.

With these points in mind, applicant and his colleagues have found in tabletop experiments that it is possible to "optimize" the choice of etalon bandpass $\gamma$, the fringe measurement technique, and the bandwidth estimator model to obtain an accurate prediction of the source at some percentage of the maximum, e.g., FWHM bandwidth, or at some enclosed energy percentage, e.g., E95 bandwidth, that is relatively immune to systematic variations in the spectral shape.

Figure 5:
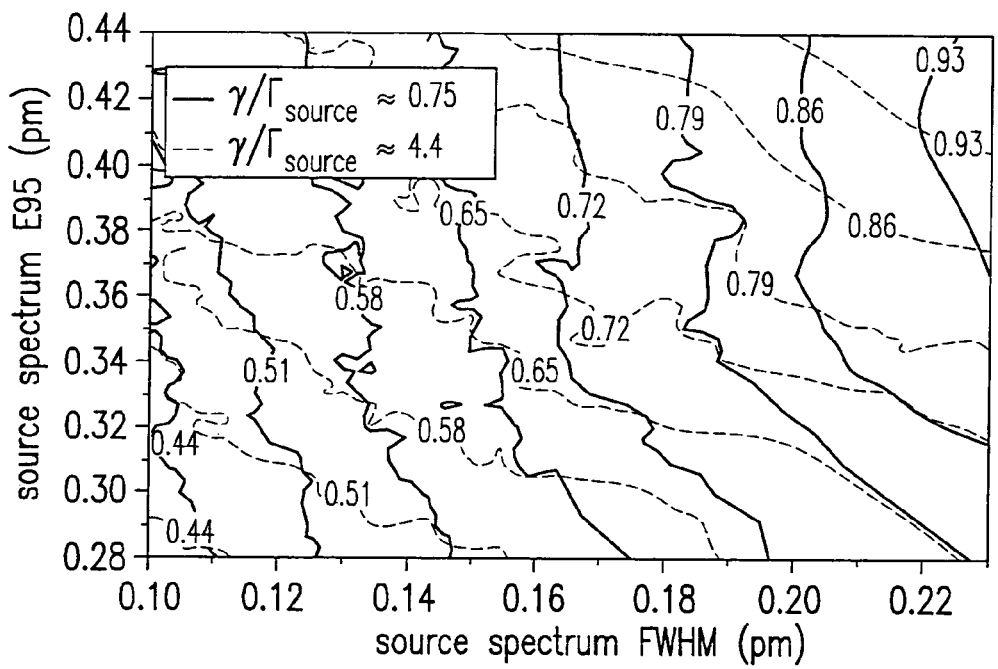
FIG. 5 shows simulated etalon-spectrometer FWHM fringe contours for ~5000 experimental light source spectra, with two sets shown illustrating the effect of different choices of the etalon FWHM bandpass γ.

Applicant and his colleagues have observed that the FWX% fringe width w(X%, $\gamma$) of an etalon spectrometer with FWHM instrumental bandpass $\gamma$ illuminated by lithography laser light sources is relatively well-modeled by $$w(X\%,\gamma) \approx A(X\%,\gamma)\Gamma_{source}+B(X\%,\gamma)E_{source}+C(X\%,\gamma), \quad (8)$$

where A, B, and C are constants that depend on the spectrometer instrument function and the fraction of intensity at which the full-width of the fringe is measured, and $\Gamma_{source}$, $E_{source}$ are the FWHM and E95 of the source spectrum $S(\gamma)$, respectively, which in part is the subject of the above referenced patent application Ser. No. 10/109,223 by applicant. Equation 8 is a further generalization of the models discussed herein, taking into account the dependence of the fringe width on the source spectrum. When the ratio $E_{source}/\Gamma_{source}$=constant or $E_{source}$=constant the point-slope model obtains, and when either of these conditions hold with A≈1, the constant-offset model obtains. The coefficients of Equation 8 can be determined by computer simulation or calibration against a trusted standard. In practice, it is helpful to use simulations as a guide in choosing the parameters X, $\gamma$ and the functional form of the estimator model to obtain the desired sensitivity. The suitability of Equation 8 can be judged for a given population of spectral shapes by plotting the fringe width versus the E95 and FWHM of the source spectrum. The model can be validated by plots such as that shown in FIG. 5, where the ratio $E_{source}/\Gamma_{source}$ is not constant over the population but the data still lie close to a plane in ($\Gamma_{source}$, $E_{source}$, w) three-dimensional space. This model is not perfect, but appears to hold for a useful range of ($\Gamma_{source}$, $E_{source}$, $\gamma$) values. Note that a plane also obtains when $E_{source}/\Gamma_{source}$=constant, so it is important to verify the behavior using a spectral sample that has significant variation in this ratio.

Figure 6:
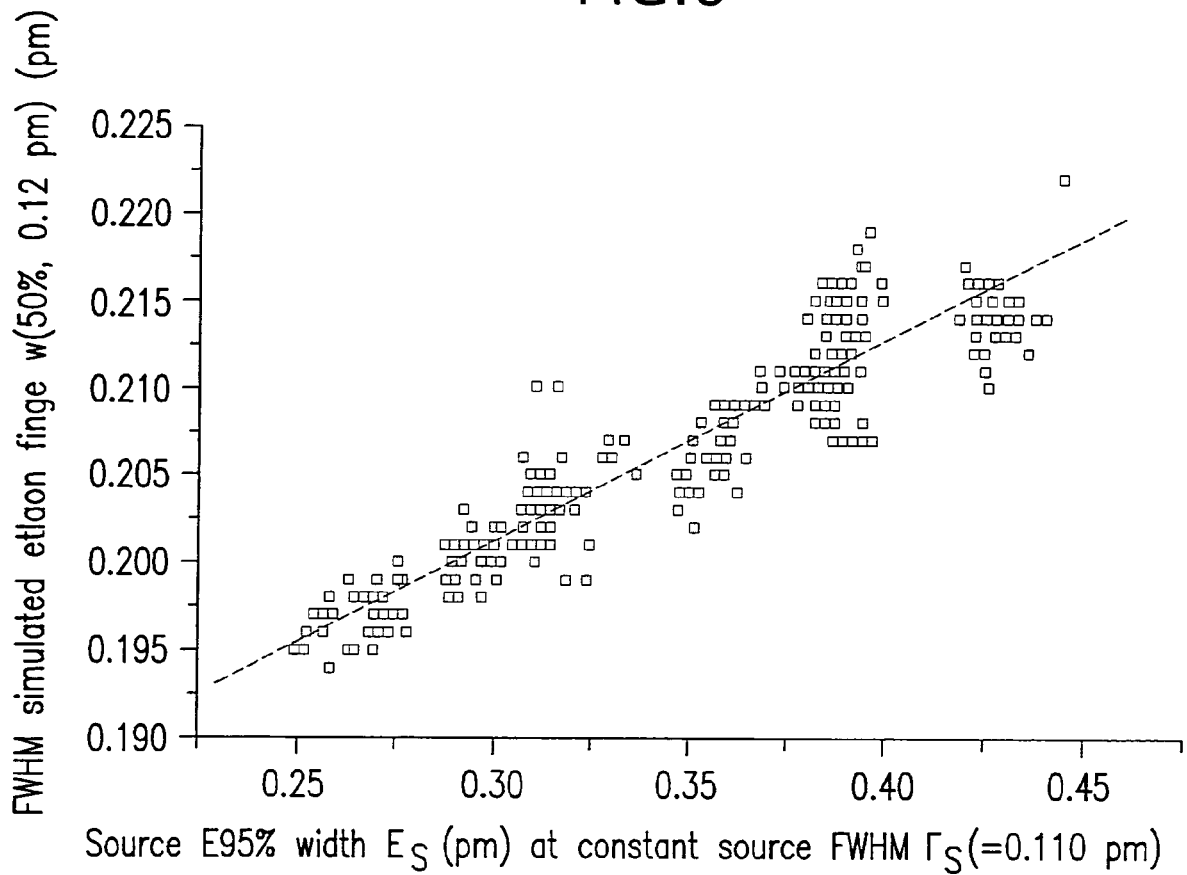
FIG. 6 shows how leakage of energy from the near spectral wings broadens the FWHM of an etalon fringe according to a simulation of a Lorentzian spectrometer with 0.12 pm FWHM bandpass convolved with real light source spectra all having identical FWHM bandwidths of 0.11 pm.
Figure 7A:
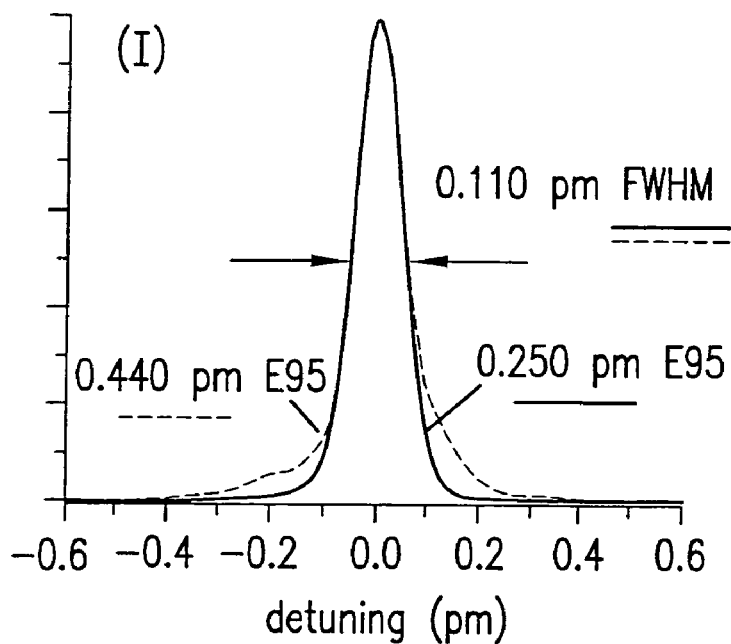
FIGS. 7A and B show, respectively, two measured laser spectra with identical 0.11 pm FWHMs and different E95 bandwidths (I) and their convolutions with a Lorentzian instrument function of 0.12 pm FWHM bandwidth, indicating that the convolved fringe widths at various thresholds are different for the two spectra; the amount of discrepancy being shown as Δ in (II), which difference is, e.g., the source of systematic error for constant-offset and point-slope FWHM models due to spectral shape change, as described in the present application.
Figure 7B:
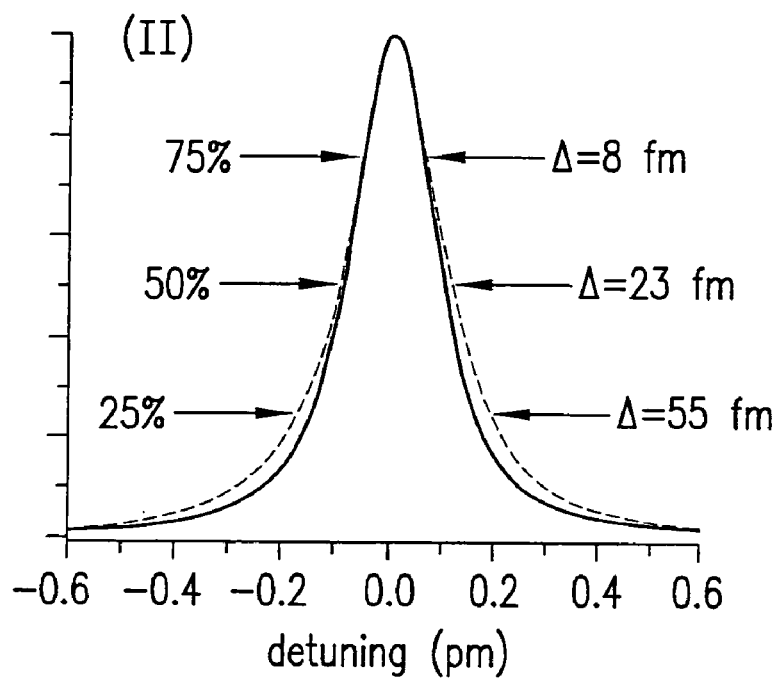

For experimentally determined spectral shapes of the kind described above, applicant and his colleagues have found that A≈B when $\gamma \approx E_{source}$ and X=50%. If $\gamma \approx E_{source}/2 \approx \Gamma_{source}$ and X=50%, applicant and his colleagues have found that A≈3.5B. This confirms the expectation that as the FWHM of the etalon instrument function $\gamma$ narrows, the fringe width w at 50% intensity more perfectly tracks the source spectral FWHM in spite of shape changes. Applicants have considered the implications of this, namely, if a point-slope model is used to estimate the FWHM bandwidth of the source spectrum from the FWHM of an etalon fringe with too wide a choice of $\gamma$, some E95 "bleeds through" the instrument function, as can be seen, e.g., in FIG. 6. This is because convolution with the instrument function pulls some energy from the wings of the source spectrum into the core of the etalon fringe. If the FWHM (~core) and E95 (~wings) of the source spectrum vary independently as they are demonstrated to do in the discussions above, a systematic error can be seen to appear in the estimate of the source FWHM, as illustrated, e.g., in FIGS. 7A and B.

In designing an etalon spectrometer, the available choices of $\gamma=FSR/\Im$ are highly constrained by the availability of high-quality reflective coatings, low-loss/high-flatness substrates, and cavity spacers with very low wedge angles. Therefore, the optimal choices are not usually available especially with current generation and future DUV light sources and with current generation and upcoming lithography tool requirements. Applicant has discovered, however, that a remedy to this situation may be found, e.g., by adjusting the threshold parameter X for a given spectral width detection utilized in a new model. The results of a simulation, e.g., as plotted in FIG. 8 illustrate the effect of increasing X from 25% to 50% to 75% of the fringe peak intensity, e.g., as measured by the bandwidth detector, and forming the bandwidth detector output, on the error in estimating the FWHM bandwidth of a large population of source spectra with shape variation, e.g., when using a point-slope model and $\gamma \approx \Gamma_{source}$. An improvement appears as X is increased, which applicant has attributed to a reduction in the sensitivity of the width at increasing threshold to variation in the balance of energy between the core and wings of the source spectrum. This can be due, e.g., to the fact the ratio A/B increases as the threshold X increases, because the process of convolution with $I_\gamma(\lambda)$ allows less energy from the wings of the source spectrum to contribute to the FW75% compared to the FW25%.

Applicant has found a direct application of this to metrology, e.g., to E95 metrology. The fact that source spectral E95 variations at constant FWHM can be clearly discerned in the FWX% of an etalon spectrometer fringe, as illustrated, e.g., in FIGS. 6 and 7A and B, indicates, e.g., that it is possible to estimate the E95 with the required level of accuracy and stability of measurement, of a light source spectrum, without recourse to deconvolution and full integral treatment of the data. In terms of the model (Equation 8), for application of a plane-etalon spectrometer to FWHM estimation it is often sufficient to make y as small as practical and increase X to the maximum level permitted by the angular resolution of the fringe detector, e.g., a PDA, which has a resolution dependant in part on the granularity of pixels (diodes in the array) available for the intensity measurements and therefore, for such mathematical operations as interpolation. In such a case, A/B can be, e.g., >5 and, e.g., the sensitivity to shape change can be small enough to be acceptable.

For E95 estimation, however, the situation may still be challenging because it may be difficult to construct a scenario where A/B is much less than unity while still satisfying constraints that originate in other aspects of the spectrometer design (detector resolution and signal to noise, etc.)

Figure 9:
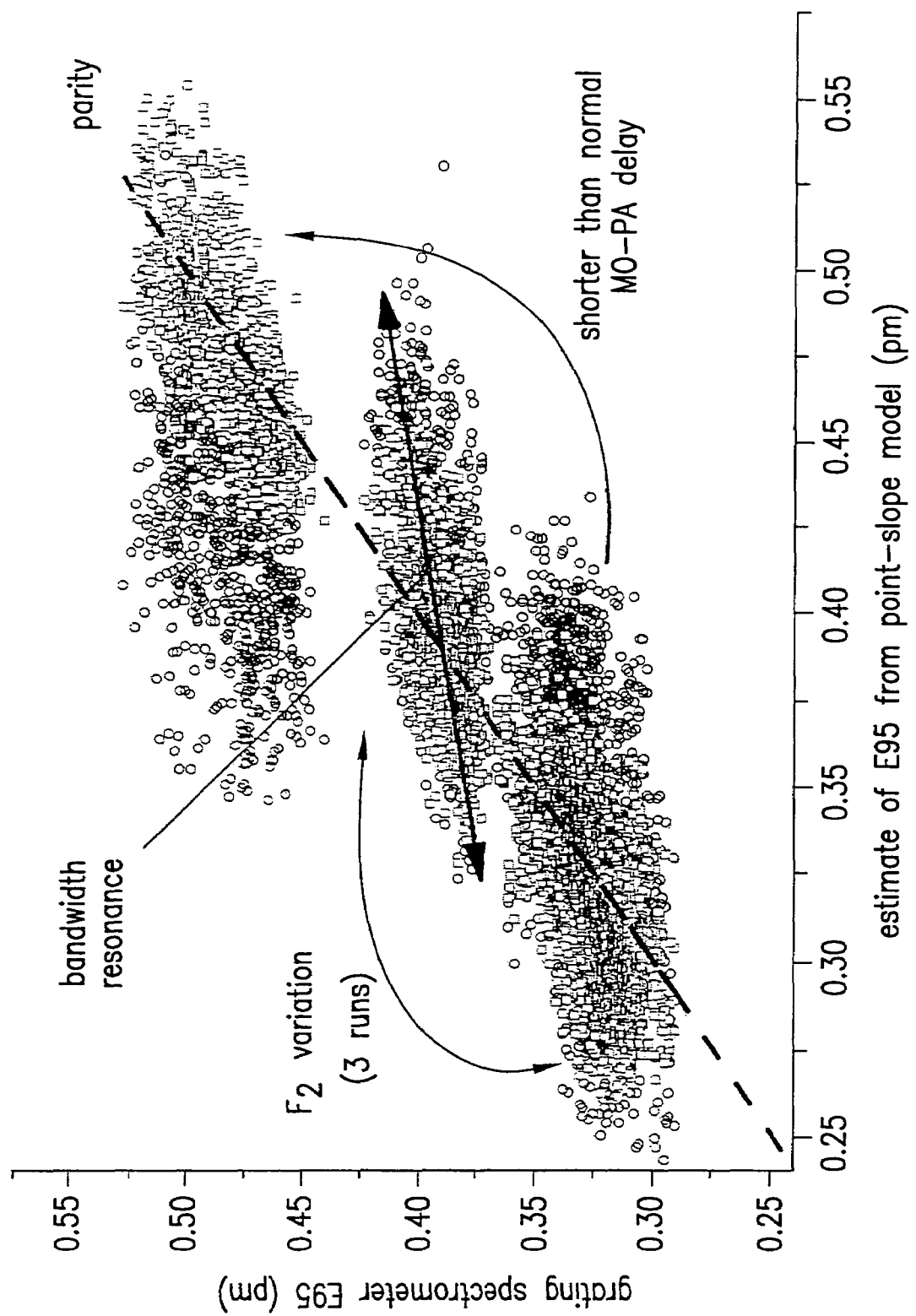
FIG. 9 shows results of experiments illustrating systematic sensitivity of fringe point-slope model estimations of E95 to spectral shape variation induced by changes in laser operating conditions, e.g., including some 3130 measured spectra, with gray squares using fringe FW35% as input and black circloids using fringe FW75%, with two or three distinct slopes and three distinct intercepts being apparent, corresponding to different spectral-shape subsets of the data.

Applicant and his colleagues have examined the usefulness of etalon spectrometers for application to metrology, e.g., E95 metrology by examining the behavior of the FW35% and FW75% fringe widths of an experimental spectrometer with $\gamma \approx \text{Max}\{E_{source}\}$. This $\gamma$ was chosen, e.g., because it gives acceptable sensitivity to the energy content in the wings of the source spectrum without excessively compromising other performance aspects. In the experiments, a Cymer XLA 100 prototype laser DUV light source was run over a wide range of conditions within and beyond its normal operating envelope so as to generate significant variations in the bandwidth and spectral shape of its output (corresponding to conditions and variations of the types I-III of FIGS. 1A-C). The light from this source was homogenized and used to illuminate both a high-resolution double-pass echelle grating spectrometer and the experimental etalon spectrometer 40 simultaneously. The grating spectrometer output was deconvolved using Fourier methods and the corresponding E95 bandwidths were computed, and the etalon fringe patterns obtained during the grating spectrometer exposure were analyzed and separate fringe values $w_1$ and $w_2$, e.g., the fringe FW35% and FW75% values reported. The results are presented in FIG. 9 as a plot of the fringe width at the two intensity thresholds versus the E95 of the deconvolved source spectrum recorded by the grating spectrometer. Viewed from a point-slope perspective $$E_{source} \approx m \cdot w(X\%, \gamma) + b, \quad (9)$$

The fringe width follows the source E95 bandwidth change due to, e.g., MOPA timing offset and fluorine enrichment with one slope m, but responds with a completely different slope m'≠m against source E95 change due to chamber acoustic phenomena, a consequence of the different types of concomitant variation in bandwidth and spectral shape associated with different physical processes within the laser. The best-fit intercepts b also vary as a function of operating point. Therefore, applicant has concluded from this and other experiments that a full-width measurement at a single intensity threshold X is insufficient for robust E95 estimation in the presence of shape variation.

Recognizing that the single-threshold approach is inadequate, applicant and his colleagues considered some other techniques that follow from the fringe width model (Equation 8). In one technique, two etalon spectrometers can be designed so as to obtain sufficiently different coefficients A, B, C, for each, as is also the subject of an above referenced patent application Ser. No. 10/615,321 in the name of applicant. Such spectrometers may be operated simultaneously and in parallel to obtain two different fringe widths; armed with these fringe widths and the set of six coefficients, the system of two multivariable linear equations may be solved for the unknown source FWHM or E95. This method, however, while potentially very successful in its own right, has the cost and complexity disadvantage of requiring two separate etalon spectrometers. Simulations indicate, however, that it can report very good estimates of both the FWHM and E95 of the source if the coefficients are chosen properly and certain detection constraints can be satisfied, as is the subject of the above referenced patent application.

An alternative method, according to an embodiment of the present invention, that can provide a robust E95 estimate of the source spectrum while, e.g., using only a single etalon, applies Equation 8 in a different way. In this approach, according to an embodiment of the present invention, the etalon bandpass $\gamma$ is fixed by the finesse and choice of FSR, but the values of the coefficients A, B, and C can still be changed in a significant way by altering the intensity threshold X at which the width measurement is performed. For example, for two sufficiently different choices of X, a plane equation can be once again obtained.

Figure 10:
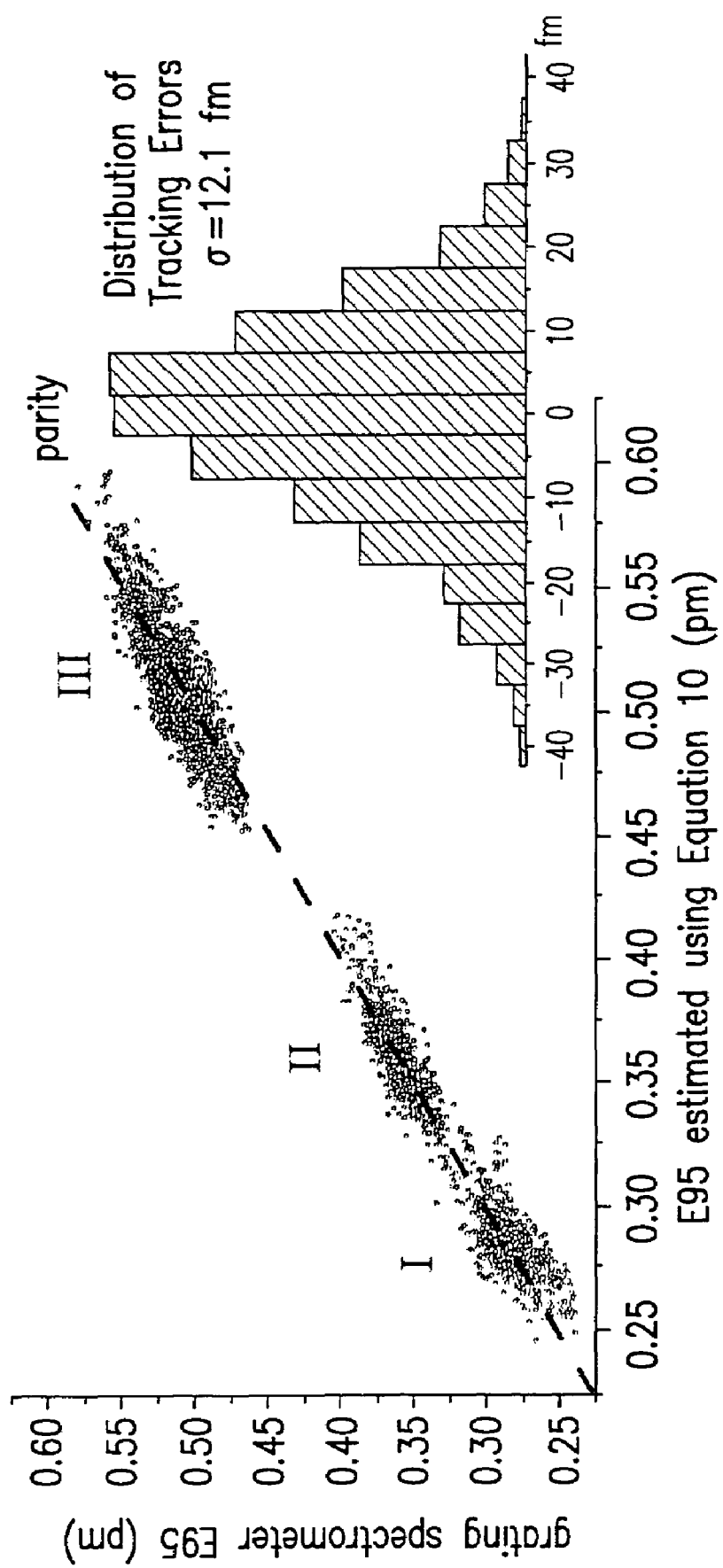
FIG. 10 shows predictions of E95 using a two intensity-threshold (FW35%+75%) model of a bandwidth equation, showing 3250 spectra from 4 separate experiments combined: Group I, normal $F_2$ concentration with delayed MOPA timing; Group II, normal $F_2$ and normal timing; Group III, enriched $F_2$, also normal $F_2$ with shortened MOPA timing, with deviation from parity better controlled compared to point-slope model of FIG. 9, and with the inset showing the distribution of tracking errors for the spectral population, with a sigma of 12.1 fm, about 4 fm of which can be explained by the finite signal to noise ratio ("SNR") of the source spectrum.

To test this embodiment of the present invention, applicant and his colleagues repeated the experiments, e.g., with the E95 estimator model altered to use, e.g., two intensity thresholds. In this set of measurements, the model chosen was:

$$E_{source} \approx K \cdot w(35\%, \gamma) + L \cdot w(75\%, \gamma) + M, \quad (10)$$

where K, L, M are calibration constants determined by the best fit of the grating spectrometer measured source spectral E95 to the model. With this change, the source E95 estimation accuracy over a wide range of spectral, shape variations is significantly improved, as can be seen, e.g., by the experimental results, e.g., plotted in FIG. 10. In accordance with the model of Equation 8, applicant and his colleagues believe that the combination of, e.g., two FWX% terms partly "senses" independent changes of the source spectral energy distribution in the core and near wings of the spectral line. This model therefore corrects for the independent variation of FWHM and E95 to which the simple one-dimensional (point-slope) model is insensitive. There still remains some systematic deviation, but the sigma of the error distribution for the given spectral population was reduced by about a factor of two when applying the improved technique according to an embodiment of the present invention. Similarly applicant and his colleagues believe that the use of two sufficiently separated EX% measurements as the bandwidth detector output width measurements can have the same effect. The use of the two separate and separated X% values for either FW or E measurements in the bandwidth detectors can be effective in determining the actual bandwidth parameter desired, whether FW or E, e.g., FWHM or E95, depending only on the generation of the appropriate constants K, L and M for a given instrument, e.g., a particular etalon, as described above. Similarly, the two measurements with the etalon used for calibration and later actually sensed, may be one each of the FW and E variety with the same results.

Also, those skilled in the art will appreciate that with a single width detection apparatus, e.g., a PDA, the data needed to process the values for $w_1$, e.g., a FWXM or an EX', on the one hand and a $w_2$, e.g., a FWX"M or an EX'", where if both are FW or E, then X≠X" and X'≠X'" is available. Then the two values of $w_1$ and $w_2$ may conveniently and expeditiously computed simultaneously according to the operation of the detector and its associated processor from the intensity values obtained from, e.g., the PDA.

While the computation of an energy width (EX %) of the etalon spectrometer fringe for use as an input to a point-slope or other model can be more computationally demanding, due, e.g., to the integration required, it is still achievable, and improved computation speeds and/or special DSP circuitry, e.g., optimized for the integration task, make this a viable solution. It may even have certain advantages, however, when it comes to latitude in etalon selection and other aspects of the spectrometer design.

It will also be understood that at best the actual bandwidth parameter, e.g., FWHM or E95, that is the ultimate output of the apparatus and method according to the embodiment of the present invention disclosed herein, is only an estimate thereof. It is, however, the actual value so far as the laser light source and its measurement and control systems and/or lithography system are concerned. As used in this application, including in the claims, the "actual" value of the bandwidth measurement parameter or the "estimated actual" value are used interchangeably to mean this finally determined value arrived at according to the disclosed embodiments of the present invention and then relied upon by the rest of the system as the best and closest determination of the desired bandwidth measurement parameter, e.g., FWHM or E95, that the system can produce within the limits discussed herein.

From the above, it will be understood by those skilled in the art that in spite of a variety of shortcomings, etalon spectrometers have distinct advantages for application to bandwidth metrology onboard line-narrowed excimer light sources used in DUV lithography. These light sources have been shown to exhibit dependence of the detailed shape or functional form of their output spectra, e.g., due to certain specific operating conditions. Such shape changes can introduce large systematic errors into methods commonly used to estimate bandwidth due to the non-negligible influence of the bandpass of the instrument function of practical embodiments of these spectrometers. Fortunately, through application of a simple etalon fringe width model, according to an embodiment of the present invention some special methods that are less sensitive to these variations are proposed. When used, these techniques can suppress errors related to spectral shape variation by introducing measurement sensitivity to the relative energy distribution between the core and near wings of the spectrum. Because of the sensitivity of the lithographic process to the illumination bandwidth, management of this source of systematic error is important to current and future applications, particularly those involving active control or stabilization of the source spectrum.

It will also be understood by those skilled in the art that at a more conceptual level an embodiment of the present invention relates to a bandwidth meter method and apparatus that may comprise an optically dispersive instrument, which may comprise an etalon for example, which disperses the energy comprised in the light output of an light source, which may be, e.g., a laser DUV source, or perhaps an EUV light source, e.g., either utilizing a laser produced plasma ("LPP") or a discharge produced plasma ("DPP"). The dispersion converts the output light in its natural wavelength domain into a spatial or temporal domain according to the wavelength distribution of the light energy output from the of the light source. The invention further contemplates, e.g., a detector, e.g., a photodiode array, that records, respectively, the spatial or temporal variation of wavelength distribution of the energy, e.g., by utilizing a lateral photodiode array recording light intensities along the extent of the array and also may further provide an output signal based upon the recorded spatial or temporal variation. The output signal may comprise, e.g., a plurality of widths, e.g., measured between pixels on the array, representative of a spectrum full width at some percent of the maximum within the full width of the spectrum of light emitted from the light source ("FWXM") and ("FWX'M") or a width between two points on the spectrum defining a content of the spectrum enclosing some percentage of the energy of the full spectrum of the spectrum of light emitted from the light source ("EX''") and ("EX'''").

An embodiment of the invention further contemplates, e.g., that any combination of at least two of these values may be used, but that when the combination is, e.g., FWXM and FWX'M X≠X' and when the combination is, e.g., EX'' and EX''', X''≠X'''. It will also be understood by those skilled in the art that the particular combination used and the differences between, e.g., X and X' or X'' and X''' may be empirically selected according to, e.g., the type of dispersive element, the type and accuracy (measured, e.g., by SNR) of the recorder and the light source, including the types and probabilities of occurrence of distortions to the spectra of the light emitted by the light source, to each be more responsive to different aspects of the energy distribution in the spectra being measured, e.g., to the width at X% of the maximum or the width at Y% of the enclosed energy, i.e., generally speaking more responsive to the energy in differing parts of the spectra, e.g., the center portion or the skirts (wings) of the spectra.

An embodiment of the invention also contemplates, e.g., the use of a first calculation apparatus, to calculate the width of the wavelength distribution of the energy, respectively, in the space or time domain, based upon, respectively, the spatial or temporal variation of the wavelength distribution of the energy recorded by the detector, i.e., as indicated by the intensity distribution of the light detected by each photodiode (pixel) in the lateral PDA array. This first calculating device, according to an embodiment of the present invention may, e.g., convert respectively, the spatial or temporal distribution (, e.g., the sensed light intensities in the PDA) into the wavelength domain according to the optical properties of the dispersive instrument, i.e., by determining the above noted width values and output those width values.

According to an embodiment of the present invention a second calculation apparatus, utilizes at least one these width values, representative of the wavelength distribution of the energy in the wavelength domain, as calculated by the first calculation apparatus, and applies them as an argument of a multivariable equation having predetermined calibration variables specific to the optical source, the dispersive instrument, the detector, and the at least one width taken as an argument. That is to say, as noted above, according to an embodiment of the present invention, the predetermined calibration values are determined from the use of a trusted standard to measure actual wavelength of a spectra correlated to at least one width output from the particular instrument, e.g., the particular etalon spectrometer such that when that same width output is input to the second calculation apparatus, the use of the multivariable equation with the precomputed calibration variables will return the same or essentially the same desired wavelength parameter (FWXM or EX) measured by the trusted standard in the calibration process. An embodiment of the present invention disclosed above relates to using two such width measurements from the first calculation apparatus, but as here noted, it need only be at least one, and could be more than two. Also, the first and second calculation apparatus, according to another embodiment of the present invention may be the same calculation apparatus. The multivariable equation is evaluated to calculate an actual bandwidth parameter descriptive of the spectral distribution of the energy output by the light source selected from the group FWX*M, EX**.

Those skilled in the art will appreciate that the above-described embodiments of the invention do not limit the invention to particular disclosed embodiments. Many changes and modification will be understood to be available without departing from the scope and content and spirit of the accompanying claims. For example diffractive optic elements that produce the required fringe patterns or other bandwidth detection measuring parameters may be utilized besides etalons. Similarly various means are available to arrive at the width measurement values first calibrated for and then used in operation, i.e., $w_1$ (as a function of some FWXM or EX and, e.g., an instrument bandpass function) and $w_2$ (as a function of some other FWXM or EX and, e.g., the instrument bandpass function) for use in the equation of an embodiment of the present invention, other than, e.g., the process outputs from a PDA. In addition, the final outputs may be derived at the PDA itself, as opposed to being derived from processing of the PSA intensity value outputs, e.g., by incorporating a digital signal processor ("DSP") in the PDA, which may, e.g., be specifically programmed and perhaps have specialized arithmetic or algebraic or trigonometric or the like circuitry for processing certain aspects of conversion of, e.g., PDA intensity values into a $w_1$ and a $w_2$ in the form of an FWXM or EX as a real time output of the bandwidth detector apparatus and associated circuitry. Subsequent processing of, e.g., the pertinent equation for determining the actual parameter desired may then occur in a separate processor or perhaps also on the DSP itself. More granularity can be added to the bandwidth detector output in terms of, e.g., increasing the number of pixels (diodes) in the array to both speed processing and increase SNR. Other changes and modification may also be made within the scope of the appended claims and the present invention should be interpreted in scope solely from such claims.

Additionally, the embodiments described involve multivariable linear equations, however, those skilled in the art will appreciate that there may be instances where nonlinear terms may appear in the translation function containing the calibration coefficients. Also, the embodiments have been described in relation to bandwidths of laser output light of relatively narrow bandwidth, e.g., for lithography uses. However, for other light sources where narrow bandwidth determination may be required, e.g., EUV light sources and using similar or other forms of monochromatography where similar inaccuracies are introduces in the measurements due to instrument characteristics, the present invention may also be utilized. Furthermore, some details have been given as to the determination of the calibration coefficients, but it will also be understood by those skilled in the art that some measurement of actual bandwidth as determined by a so-called "trusted standard" correlated against the occurrence of the two values of the first and second bandwidth monitor outputs can be made with the application of well known and understood standard error propagation techniques. What is required for the performance (accuracy) of a "trusted standard" is that the random errors of the trusted standard, as determined using error propagation techniques, e.g., as set out in Berington, Data Reduction and Error Analysis for the Physical Sciences, must be of the same order or less than the random errors for the, e.g., etalon measurements from the bandwidth monitor that are propagated through the multivariable transformation equation (s)

I claim:

1. A bandwidth meter for measuring the bandwidth of a spectrum of light emitted from a laser input to the bandwidth meter comprising:
   an optical bandwidth monitor providing a first output representative of a first parameter which is indicative of the bandwidth of the light emitted from the laser and a second output representative of a second parameter which is indicative of the bandwidth of the light emitted from the laser; and,
   an actual bandwidth calculation apparatus utilizing the first output and the second output as part of a multivariable equation employing predetermined calibration variables specific to the optical bandwidth monitor, to calculate an actual bandwidth parameter.

2. The apparatus of claim 1 further comprising:
   the actual bandwidth parameter is a spectrum full width at some percent of the maximum within the full width of the spectrum of light emitted from the laser ("FWXM").

3. The apparatus of claim 1, further comprising:
   the actual bandwidth parameter is a width between two points on the spectrum defining a content of the spectrum enclosing some percentage of the energy of the full spectrum of the spectrum of light emitted from the laser ("EX").

4. The apparatus of claim 1 further comprising:
   the bandwidth monitor is an etalon and the first output is representative of at least one of a width of a fringe of an optical output of the etalon at FWXM or a width between two points on the spectrum enclosing some percentage of the energy of the full spectrum of light emitted from the laser ("EX'") and the second output is representative of at least one of a second FWX"M or EX'", where X≠X" and X'≠X'".

5. The apparatus of claim 1, further comprising:
   the precomputed calibration variables are derived from a measurement of the value of the actual bandwidth parameter utilizing a trusted standard, correlated to the occurrence of the first and second outputs for a calibration spectrum.

6. The apparatus of claim 1, further comprising:
   the value of the actual bandwidth parameter is calculated from the equation:
   estimated actual BW parameter=$K*w_1+L*w_2+M$,
   where $w_1$=the first measured output representative of FWXM or EX' and $w_2$ is the second measured output representative of FWX"M or EX'".

7. The apparatus of claim 5, further comprising:
   the value of the actual bandwidth parameter is calculated from the equation:
   estimated actual BW parameter=$K*w_1+L*w_2+M$,
   where $w_1$=the first measured output representative of FWXM or EX' and $w_2$ is the second measured output representative of FWX"M or EX'".

8. A photolithography light source comprising:
   a bandwidth meter for measuring the bandwidth of a spectrum of light emitted from a laser input to the bandwidth meter comprising:
      an optical bandwidth monitor providing a first output representative of a first parameter which is indicative of the bandwidth of the light emitted from the laser and a second output representative of a second parameter which is indicative of the bandwidth of the light emitted from the laser; and,
      an actual bandwidth calculation apparatus utilizing the first output and the second output as part of a multivariable equation employing predetermined calibration variables specific to the optical bandwidth monitor, to calculate an actual bandwidth parameter.

9. The apparatus of claim 8 further comprising:
   the actual bandwidth parameter is a spectrum full width at some percent of the maximum within the full width of the spectrum of light emitted from the laser ("FWXM").

10. The apparatus of claim 8, further comprising:
    the actual bandwidth parameter is a width between two points on the spectrum enclosing some percentage of the energy of the full spectrum of the spectrum of light emitted from the laser ("EX").

11. The apparatus of claim 8 further comprising:
    the bandwidth monitor is an etalon and the first output is representative of at least one of a width of a fringe of an optical output of the etalon at FWXM or a width between two points on the spectrum enclosing some percentage of the energy of the full spectrum of light emitted from the laser ("EX'") and the second output is representative of at least one of a second FWX"M or EX'", where X≠X" and X'≠X'".

12. The apparatus of claim 8, further comprising:
    the precomputed calibration variables are derived from a measurement of the value of the actual bandwidth parameter utilizing a trusted standard, correlated to the occurrence of the first and second outputs for a calibration spectrum.

13. The apparatus of claim 8, further comprising:
the value of the actual bandwidth parameter is calculated from the equation:
estimated BW parameter=$K*w_1+L*w_2+M$,
where $w_1$=the first measured output representative of FWXM or EX' and $w_2$ is the second measured output representative of FWX"M or EX'".

14. The apparatus of claim 12, further comprising:
the value of the actual bandwidth parameter is calculated from the equation:
estimated BW parameter=$K*w_1+L*w_2+M$,
where $w_1$=the first measured output representative of FWXM or EX' and $w_2$ is the second measured output representative of FWX"M or EX'".

15. A photolithography light source comprising:
a bandwidth meter for measuring the bandwidth of a spectrum of light emitted from a laser input to the bandwidth meter comprising:
an optical bandwidth monitor providing a first output representative of a first spectrum width measurement as measured by the bandwidth monitor and a second spectrum width measurement measured by the optical bandwidth monitor; and,
an actual bandwidth calculation apparatus utilizing the first output and the second output as part of a multivariable equation employing predetermined calibration variables specific to the optical bandwidth monitor, to calculate an actual bandwidth parameter.

16. The apparatus of claim 15 further comprising:
the actual bandwidth parameter is a spectrum full width at some percent of the maximum within the full width of the spectrum of light emitted from the laser ("FWXM").

17. The apparatus of claim 15, further comprising:
the actual bandwidth parameter is a width between two points on the spectrum enclosing some percentage of the energy of the full spectrum of the spectrum of light emitted from the laser ("EX").

18. The apparatus of claim 15 further comprising:
the bandwidth monitor is an etalon and the first output is representative of at least one of a width of a fringe of an optical output of the etalon at FWXM or a width between two points on the spectrum enclosing some percentage of the energy of the full spectrum of light emitted from the laser ("EX'") and the second output is representative of at least one of a second FWX"M or EX'", where X≠X" and X'≠X'".

19. The apparatus of claim 15, further comprising:
the precomputed calibration variables are derived from a measurement of the value of the actual bandwidth parameter utilizing a trusted standard, correlated to the occurrence of the first and second outputs for a calibration spectrum.

20. The apparatus of claim 15, further comprising:
the value of the actual bandwidth parameter is calculated from the equation:
estimated BW parameter=$K*w_1+L*w_2+M$,
where $w_1$=the first measured output representative of FWXM or EX' and $w_2$ is the second measured output representative of FWX"M or EX'".

21. The apparatus of claim 19, further comprising:
the value of the actual bandwidth parameter is calculated from the equation:
estimated BW parameter=$K*w_1+L*w_2+M$,
where $w_1$=the first measured output representative of FWXM or EX' and $w_2$ is the second measured output representative of FWX"M or EX'".

22. A photolithography light source comprising:
a bandwidth meter for measuring the bandwidth of a spectrum of light emitted from a laser input to the bandwidth meter comprising:
an optical bandwidth monitor providing a first output representative of a first spectrum width measurement as measured by the optical bandwidth detector and a second spectrum width measurement measured by the optical bandwidth detector; and,
an actual bandwidth calculation apparatus utilizing the first output and the second output as part of a multivariable equation employing predetermined calibration variables specific to the optical bandwidth monitor, to calculate an actual bandwidth parameter.

23. The apparatus of claim 22 further comprising:
the actual bandwidth parameter is a spectrum full width at some percent of the maximum within the full width of the spectrum of light emitted from the laser ("FWXM").

24. The apparatus of claim 22, further comprising:
the actual bandwidth parameter is a width between two points on the spectrum enclosing some percentage of the energy of the full spectrum of the spectrum of light emitted from the laser ("EX").

25. A method for measuring the bandwidth of a spectrum of light emitted from a laser input to the bandwidth meter comprising:
utilizing an optical bandwidth monitor, providing a first output representative of a first parameter which is indicative of the bandwidth of the light emitted from the laser and a second output representative of a second parameter which is indicative of the bandwidth of the light emitted from the laser; and,
in an actual bandwidth calculation apparatus, utilizing the first output and the second output as part of a multivariable linear equation employing predetermined calibration variables specific to the optical bandwidth monitor, calculating an actual bandwidth parameter.

* * * * *